(12) United States Patent
Gerlach

(10) Patent No.: US 10,623,412 B2
(45) Date of Patent: Apr. 14, 2020

(54) METHOD FOR PREVENTING DEACTIVATION OF ONLINE SERVICES IN A VEHICLE

(71) Applicant: VOLKSWAGEN AG, Wolfsburg (DE)

(72) Inventor: Matthias Gerlach, Potsdam (DE)

(73) Assignee: Volkswagen AG (DE)

(*) Notice: Subject to any disclaimer, the term of this patent is extended or adjusted under 35 U.S.C. 154(b) by 343 days.

(21) Appl. No.: 15/381,169

(22) Filed: Dec. 16, 2016

(65) Prior Publication Data
US 2017/0180381 A1  Jun. 22, 2017

(30) Foreign Application Priority Data
Dec. 17, 2015 (DE) .................. 10 2015 225 793

(51) Int. Cl.
*B60R 25/01* (2013.01)
*H04L 29/06* (2006.01)
*H04W 48/06* (2009.01)
*H04L 29/08* (2006.01)

(52) U.S. Cl.
CPC .......... *H04L 63/101* (2013.01); *B60R 25/01* (2013.01); *H04W 48/06* (2013.01); *H04L 67/12* (2013.01)

(58) Field of Classification Search
CPC ..... B60R 25/00; B60R 25/001; B60R 25/002; H04W 48/02
See application file for complete search history.

(56) References Cited

U.S. PATENT DOCUMENTS

| | | | |
|---|---|---|---|
| 5,774,550 A * | 6/1998 | Brinkmeyer | B60R 25/00 340/5.7 |
| 6,040,763 A * | 3/2000 | Nakajima | B60R 25/00 340/425.5 |
| 6,552,648 B1 * | 4/2003 | Rick | B60R 25/00 180/287 |
| 7,777,612 B2 * | 8/2010 | Sampson | G08B 13/1427 173/2 |
| 2005/0068191 A1 * | 3/2005 | Eschke | B60R 16/0231 340/13.25 |
| 2005/0261816 A1 * | 11/2005 | DiCroce | B60R 25/00 701/36 |
| 2006/0250272 A1 | 11/2006 | Puamau | |

(Continued)

FOREIGN PATENT DOCUMENTS

| | | | |
|---|---|---|---|
| DE | 102010030794 A1 | 1/2012 | |
| DE | 102012011483 | * 12/2013 | ......... B60H 1/00642 |

(Continued)

OTHER PUBLICATIONS

Search Report from German Patent Application No. 10 2015 225 793.2; dated Sep. 29, 2016.

*Primary Examiner* — Khang Do
(74) *Attorney, Agent, or Firm* — Barnes & Thornburg LLP

(57) ABSTRACT

A method for preventing deactivation of online services in a vehicle. The method includes generating a configuration message that contains details of what online services that are active in the vehicle cannot be deactivated, wherein the generation takes place on a computer unit that is at least temporarily connected to the vehicle; transmitting the configuration message to the vehicle; reading the configuration message in the vehicle; and disabling the option of deactivating online services in the vehicle in accordance with the configuration message.

10 Claims, 1 Drawing Sheet

(56) References Cited

U.S. PATENT DOCUMENTS

| | | | |
|---|---|---|---|
| 2011/0172879 A1* | 7/2011 | Abe | G06Q 10/06 701/33.4 |
| 2011/0202983 A1* | 8/2011 | Pope | G06F 21/572 726/7 |
| 2013/0311001 A1* | 11/2013 | Hampiholi | B60R 25/25 701/1 |
| 2014/0155052 A1* | 6/2014 | Glover | H04L 41/5054 455/419 |
| 2015/0022663 A1* | 1/2015 | Wang | B60R 25/102 348/148 |
| 2015/0057881 A1* | 2/2015 | Raab | H04M 1/72536 701/36 |
| 2015/0120083 A1* | 4/2015 | Gurovich | G07C 5/008 701/1 |
| 2016/0214572 A1* | 7/2016 | Snider | B60R 25/241 |

FOREIGN PATENT DOCUMENTS

| | | |
|---|---|---|
| DE | 102012011483 A1 | 12/2013 |
| DE | 102012217615 A1 | 5/2014 |

* cited by examiner

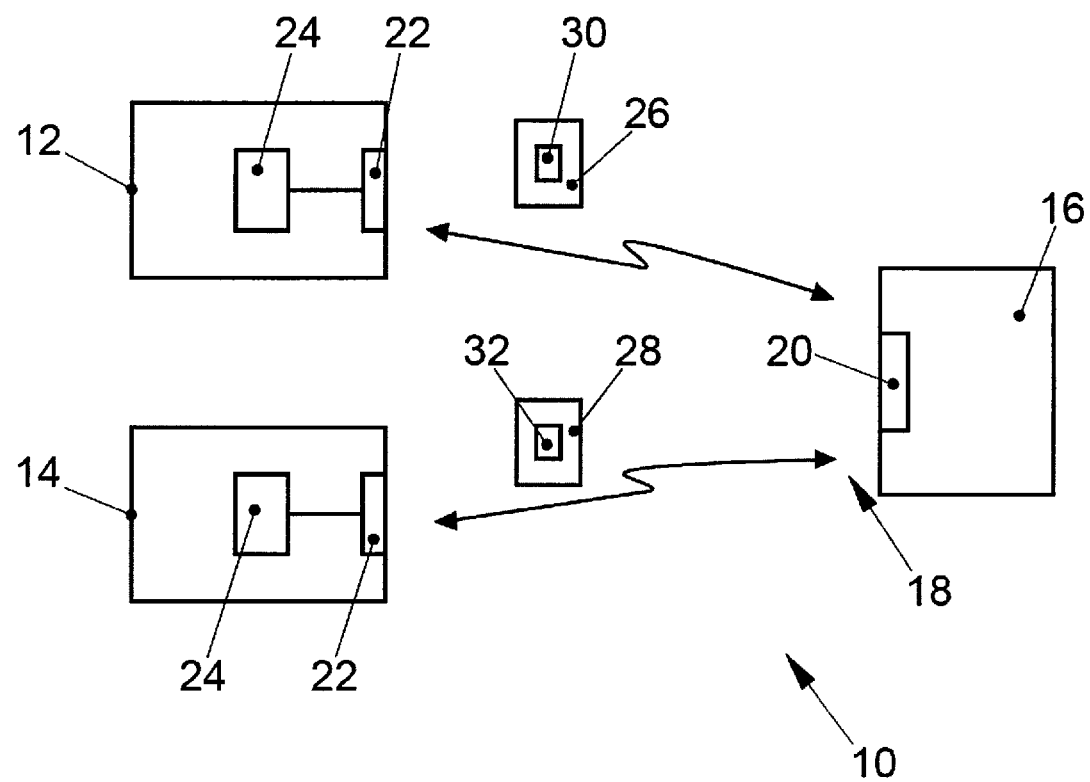

METHOD FOR PREVENTING DEACTIVATION OF ONLINE SERVICES IN A VEHICLE

PRIORITY CLAIM

This patent application claims priority to German Patent Application No. 10 2015 225 793.2, filed 17 Dec. 2015, the disclosure of which is incorporated herein by reference in its entirety.

SUMMARY

Illustrative embodiments relate to a method for preventing the deactivation of online services in a vehicle, and to a vehicle.

BRIEF DESCRIPTION OF THE DRAWINGS

Disclosed embodiments are explained below with reference to the associated drawing, in which:

FIG. 1 shows a schematic representation of a system for preventing the deactivation of online services in a vehicle.

DETAILED DESCRIPTION

Vehicles, such as automobiles, for example, increasingly have online services available. These online services comprise security and comfort functions such as opening the doors, activating the vehicle from outside, theft prevention and weather and navigation services.

The question arises as to how and by whom online services can be activated and deactivated, so that all security requirements are always met.

DE 10 2012 217 615 A1 discloses a control device that takes the recorded position of the vehicle and/or the recorded time of day as a basis control the activation and/or deactivation of a system of the vehicle.

DE 10 2010 030 794 A1 discloses a method for processing data in a controller of a vehicle in which a data protection mode is activable for the controller by a user of the vehicle. In this data protection mode, predetermined data to which the controller has access during vehicle use are prevented from being transmitted from the vehicle.

US 2006/0250272 A1 discloses a system that allows the police, following access to a database, to use a deactivation signal to deactivate particular functions of the vehicle.

Disclosed embodiments configure the deactivation of online services in a vehicle.

Disclosed embodiments provide a method and a vehicle.

The disclosed method for preventing the deactivation of online services in a vehicle comprises:

generating a configuration message that contains details of what online services that are active in the vehicle cannot be deactivated, wherein the generation takes place on a computer unit that is at least temporarily connected to the vehicle;

transmitting the configuration message to the vehicle;

reading the configuration message in the vehicle; and disabling the option of deactivating online services in the vehicle in accordance with the configuration message.

The disclosed method provides secure and central disabling of the deactivation of services in the area of the mobile online services. This is achieved by a central definition of what services cannot be switched off, for example, by diagnosis. The central definition can take place, by way of example, in a backend of the vehicle manufacturer or of the service provider. This definition via the configuration message is created individually for each vehicle, allowing precise matching to the respective service and/or security profile of the vehicle. The selective inability of all or selected online services to be switched off hampers, by way of example, theft of a vehicle, since tracking services cannot be switched off.

The configuration message may be part of a list of services that shows services performable by the vehicle. This facilitates integration into already existing systems having such a list of services. Since the services that are available to or performable by the vehicle are thematically related to the inability to switch them off, that is to say to the disabling of the option of deactivation, it may be beneficial to combine all information in such a list of services. This can simplify transmission from the computer unit to the vehicle, for example, when there is no permanent connection.

There may be provision for the configuration message to be used to prevent the performance of a flight mode and/or of a transport mode of the vehicle. These modes could otherwise be used to indirectly deactivate services, such as location services for theft prevention, for example, which is prevented by the blocking of the flight mode and/or of the transport mode.

The disabling, that is to say the inhibition or blockage of a switch-off option, can prevent online services from being deactivated locally in the vehicle. This prevents a user of the vehicle, an unauthorized person or a service employee in a workshop from being able to deactivate online services in or on the vehicle.

The disabling can prevent online services from being made unavailable. This making-unavailable comprises actions such as switching off online services, uninstalling online services, pausing online services or the like. Such actions are generally prevented. There may be provision for particular persons or entities, such as the vehicle manufacturer or a service provider, for example, to be able to perform such actions. This performability can be ensured by means of special access authorizations such as codes, authentication checks or the like, so that only authorized parties can deactivate one or more online services.

The disabling can prevent a radio module of the vehicle, which the online services use to communicate, from being switched off. This switching-off or deactivation and the associated interruption of the radio link could otherwise be used to indirectly deactivate services such as location services for theft prevention, for example, this being prevented by means of this measure.

The disclosed vehicle having at least one controller and a radio module that online services use to communicate provides for the at least one controller to be set up to perform a method as described above. The same benefits and modifications as described above apply.

The various embodiments that are cited in this application are combinable with one another, unless stated otherwise in individual cases.

FIG. 1 shows a system 10 for preventing the deactivation of online services in vehicles 12, 14. The vehicles 12, 14 may be, by way of example, automobiles, trucks, motorcycles, buses or trains. All land vehicles, aircraft and watercraft are regarded as vehicles in this case. From a possible fleet of vehicles of a manufacturer or fleet of subscribers of a service provider, two vehicles 12 and 14 are depicted for reasons of clarity.

The two vehicles 12 and 14 are connected to a central computation unit such as a server or backend 16, for example, via a radio link 18. The radio link 18 may be a mobile radio link. The backend 16 has an interface 20 that is compatible with the radio link 18. Analogously, the vehicles 12, 14 each have a corresponding interface 22.

Each vehicle 12, 14 has at least one controller 24 that is connected to the interface 22 to participate in the communication with the backend 16. The controller 24 may be connected to the interface 22 either directly or via a further controller, for example, a controller for online services. The interface 22 may also be a radio module of the vehicle 12, 14 or a part thereof.

Via the radio link 18, individual online services are available to each vehicle 12 and 14 in association with the backend 16. These online services comprise security-relevant services, for example, geotracking or theft prevention, and comfort services, such as remote-controlled temperature setting in the vehicle 12, 14 or internet services, for example.

Each vehicle 12 or 14 receives from the backend 16 an individual list of services 26 or 28. These lists of services 26, 28 contain all the online services that the respective vehicle 12, 14 can perform or in which it can participate. The online services specified in the lists of services 26, 28 are dependent partly on the vehicles 12 and 14 and partly on the drivers or keepers of the vehicles 12 and 14. The components of the vehicle 12, 14, such as controllers or the class of navigation or infotainment module used, for example, determine what online services can be performed by the vehicle 12, 14. Additionally or alternatively, properties of the driver or keeper, such as chargeable enabling of an online service, for example, determine what online services can be performed by the vehicle 12, 14.

Each list of services 26, 28 contains a configuration message 30 or 32 individually configured for the respective vehicle 12, 14. Both the lists of services 26, 28 and the configuration messages 30, 32 are produced in the backend 16 and transmitted to the respective car via the radio link 18. There may be provision for production of the vehicle 12, 14 to involve a first version of the lists of services 26, 28 and of the configuration messages 30, 32 being transmitted to the vehicle 12, 14. This can also be accomplished via a wired link. Similarly, later versions of the lists of services 26, 28 and of the configuration messages 30, 32 can be transmitted via a wired link, for example, during a period in the workshop.

In this case, the configuration messages 30, 32 are part of the lists of services 26, 28. Alternatively, the two elements can be transmitted separately. In the vehicle 12, 14, both elements can then be combined to form a list of services 26, 28 or handled individually. It is possible for the lists of services 26, 28 and/or the configuration messages 30, 32 to be transmitted to the vehicles 12, 14 in encrypted form, so that a high security standard is also ensured on the transmission path.

In the vehicle 12, 14, the respective list of services 26, 28 is received and is processed by the controller 24 and if need be further units. Similarly, the configuration messages 30, 32 are received and are processed by the controller 24 and if need be further units. The configuration message 30, 32 in the respective vehicle 12, 14 is used to disable the option of deactivating online services in the vehicle 12, 14. This is accomplished by configuring controllers, for example, such as the controller 24, or the radio module or the interface 22 is prevented from being switched off.

These configurations are carried out at least predominantly in the software domain. By way of example, operator control options or menus are disabled for the user of the vehicle 12, 14, so that they cannot be used to directly or indirectly deactivate online services.

From the configuration message 30, 32, it is possible to set bits or register entries in the respective controllers 24 or control or computation units, for example, that prevent one or more online services from being deactivated. It is then no longer possible to access either a deactivation function or a deactivation option, for example, because the option is hidden in a menu, or operation of a menu item or of a switch no longer results in deactivation.

The method allows the configuration messages to be defined centrally and securely for the first time to prevent the deactivation of online services in vehicles 12, 14.

LIST OF REFERENCE SYMBOLS

10 System
12 Vehicle
14 Vehicle
16 Backend
18 Radio link
20 Interface
22 Interface
24 Controller
26 List of services
28 List of services
30 Configuration message
32 Configuration message

The invention claimed is:

1. A method for preventing deactivation of online services in a transportation vehicle having a radio module that the online services use to communicate, the method comprising:
   generating a configuration message that contains details of the online services that are active in the vehicle and cannot be deactivated, wherein the generation takes place on a computer unit that is at least temporarily connected to the transportation vehicle;
   transmitting the configuration message to the transportation vehicle via a radio link;
   reading, by a controller included in the transportation vehicle, the received configuration message in the transportation vehicle, wherein the controller includes a plurality of register entries; and
   disabling, by modifying a respective register entry on the controller, an option of deactivating at least one of the online services by the transportation vehicle for those online services indicated in the configuration message, wherein the disabling further prevents the controller and the radio module from deactivation.

2. The method of claim 1, wherein the configuration message is generated individually for the transportation vehicle and is part of a list of services performable by the transportation vehicle, and
   wherein the online services specified in the lists of services are dependent partly on the transportation vehicle and partly on a user associated with the transportation vehicle.

3. The method of claim 1, further comprising using the configuration message to prevent operation of the transportation vehicle in a flight mode and/or of a transport mode.

4. The method of claim 1, wherein the disabling prevents the at least one of the online services from being deactivated locally in the transportation vehicle.

5. The method of claim 1, wherein the disabling prevents the at least one of the online services from being made unavailable in the transportation vehicle.

6. A transportation vehicle comprising:
at least one controller; and
a radio module that online services use to communicate,
wherein the at least one controller performs a method for preventing deactivation of the online services in the transportation vehicle based on a configuration message that contains details of the online services that are active in the transportation vehicle cannot be deactivated, wherein the configuration message is generated on a computer unit that is at least temporarily connected to the transportation vehicle and the configuration message is transmitted to the transportation vehicle,
wherein the method includes the at least one controller having a plurality of register entries reading the configuration message in the transportation vehicle and disabling, by modifying a respective register entry thereon, an option of deactivating at least one of the online services by the transportation vehicle for those online services indicated in the configuration message, and
wherein the disabling further prevents the at least one controller and the radio module of the transportation vehicle from deactivation.

7. The vehicle of claim 6, wherein the configuration message is generated individually for the transportation vehicle and is part of a list of services performable by the transportation vehicle, and
wherein the online services specified in the lists of services are dependent partly on the transportation vehicle and partly on a user associated with the transportation vehicle.

8. The transportation vehicle of claim 6, wherein the configuration message is used to prevent operation of the transportation vehicle in a flight mode and/or of a transport mode.

9. The transportation vehicle of claim 6, wherein the disabling prevents the at least one of the online services from being deactivated locally in the transportation vehicle.

10. The transportation vehicle of claim 6, wherein the disabling prevents the at least one of the online services from being made unavailable in the transportation vehicle.

* * * * *